(12) United States Patent
Mahnad

(10) Patent No.: US 8,451,702 B2
(45) Date of Patent: May 28, 2013

(54) DIRECT READ AFTER WRITE FOR OPTICAL STORAGE DEVICE

(75) Inventor: Faramarz Mahnad, Brookline, MA (US)

(73) Assignee: Oracle International Corporation, Redwood City, CA (US)

(*) Notice: Subject to any disclaimer, the term of this patent is extended or adjusted under 35 U.S.C. 154(b) by 58 days.

(21) Appl. No.: 13/214,662

(22) Filed: Aug. 22, 2011

(65) Prior Publication Data

US 2013/0051203 A1 Feb. 28, 2013

(51) Int. Cl.
G11B 7/00 (2006.01)

(52) U.S. Cl.
USPC ............. 369/53.35; 369/124.03; 369/124.15

(58) Field of Classification Search
USPC .......... 369/44.37, 44.38, 47.51, 47.53, 53.35, 369/53.36, 59.11, 59.12, 116, 124.02, 124.03, 369/124.15
See application file for complete search history.

(56) References Cited

U.S. PATENT DOCUMENTS

| | | | |
|---|---|---|---|
| 4,415,938 A | | 11/1983 | Heitmann |
| 4,488,277 A | * | 12/1984 | McFarlane et al. ........... 369/116 |
| 4,980,878 A | * | 12/1990 | Szerlip ........................ 369/53.15 |
| 5,105,413 A | * | 4/1992 | Bakx ............................ 369/53.33 |
| 5,130,965 A | * | 7/1992 | Karaki et al. ............... 369/44.38 |
| 5,267,226 A | * | 11/1993 | Matsuoka et al. ......... 369/44.37 |
| 5,708,639 A | * | 1/1998 | Iwanaga ...................... 369/53.35 |
| 6,141,312 A | | 10/2000 | Masters et al. |
| 2008/0225656 A1 | | 9/2008 | Stallinga et al. |
| 2011/0141863 A1 | | 6/2011 | Mahnad |

FOREIGN PATENT DOCUMENTS

| | | |
|---|---|---|
| EP | 0 731 455 A2 | 9/1996 |
| EP | 0 860 827 A2 | 8/1998 |
| EP | 1 610 304 A2 | 12/2005 |

OTHER PUBLICATIONS

Optical head Design for 1TB Optical Tape Drive, Mandad Manavi et al., LOTS Technology, Inc.
MicroContinuum: Technology: Data Storage, "Optical Tape—A new Way to Archive Data", Copyright 2008.
International Search Report and Written Opinion mailed Nov. 30, 2012 for Int'l Appln No. PCT/US2012/049893, filed Aug. 8, 2012.

* cited by examiner

*Primary Examiner* — Thang Tran
(74) *Attorney, Agent, or Firm* — Brooks Kushman P.C.

(57) ABSTRACT

Systems and methods for data storage on an optical medium having a plurality of tracks include splitting a light beam into a higher power main beam and at least one lower power side beam that form corresponding spots spaced along a selected one of the plurality of tracks and selectively positioning and aligning the beams/spots along the selected one of the plurality of tracks using the higher power main beam to write data while reading previously written data using the at least one lower power side beam. The systems and methods may include correlating the read signal with a time-shifted write signal to provide a direct read after write capability to verify data written to the optical medium. In one embodiment, an optical tape drive includes an optical pickup unit (OPU) that generates a lower power satellite beam to read data directly after writing by a higher power main beam.

16 Claims, 4 Drawing Sheets

DIRECT READ AFTER WRITE FOR OPTICAL STORAGE DEVICE

TECHNICAL FIELD

This disclosure relates to a system and method for reading data directly after writing data in an optical storage device.

BACKGROUND

Optical recording devices such as optical disk and optical tape drives commonly use an Optical Pickup Unit (OPU) or read/write head to write and retrieve data from associated optical media. Conventional OPUs may utilize different wavelength semiconductor laser diodes with complex beam path optics and electromechanical elements to focus and track the optical beam within one or more preformatted tracks on the medium to write or store the data and subsequently read the data. Data written to the medium with a laser at higher power may be verified in a separate operation or process after writing using a lower laser power, or may be verified during the write operation by another laser or laser beam. The ability to read and verify the data during the write operation may be referred to as Direct Read After Write (DRAW). One strategy for providing DRAW functionality is to use multiple independent OPUs with one OPU writing the data as a second OPU reads the data for write verification, such as disclosed in U.S. Pat. No. 6,141,312, for example. While this approach may be suitable for some applications, it increases the cost and complexity of the storage device.

Present OPUs may use a diffraction grating or similar optics in the laser path to generate three beams from a single laser element including a higher power beam used for reading/writing data and for focusing, and two lower power satellite beams used for tracking. The three beams are focused to three corresponding spots on the surface of the optical storage medium used by the various optical and electromechanical elements of the OPU. In general, the higher power spot is positioned in the center or middle between the two satellite spots. In addition to reading/writing data and focusing, the center spot may also be used for one particular type of tracking operation in some applications. The lower power satellite spots generated from the lower power side-beams are typically used for another type of tracking operation for specific types of media.

SUMMARY

Systems and methods for data storage on an optical medium having a plurality of tracks include splitting a light beam into a higher power main beam and at least one lower power side beam that form corresponding spots spaced along a selected one of the plurality of tracks and selectively positioning and aligning the beams/spots along the selected one of the plurality of tracks using the higher power main beam to write data while reading previously written data using the at least one lower power side beam. The systems and methods may include correlating the read signal with a time-shifted write signal to provide a direct read after write capability while reducing noise associated with modulation of the write signal to verify data written to the optical medium.

In one embodiment, an optical tape drive receives an optical tape having a plurality of tracks that generally span across a width of the tape for storing data and includes an optical pickup unit (OPU) or head having optics that split a coherent light beam into a higher power main beam and at least one lower power side beam that form corresponding spots spaced along a selected one of the plurality of tracks. At least one controller coupled to the optical head selectively positions and aligns the optical head and/or beams for writing data along the selected one of the plurality of tracks using the higher power main beam while reading previously written data from the selected one of the plurality of tracks using the at least one lower power side beam while the main beam continues writing data to provide a direct read after write (DRAW) capability.

Various embodiments according to the present disclosure include a correlation detector that determines similarity between a read signal associated with data detected by the lower power side beam and a time-shifted write signal associated with the higher power main beam to verify data written to the selected one of the plurality of tracks directly after writing. The correlation detector may combine the read signal and the time-shifted write signal and compares a resulting signal to an associated threshold to verify integrity of data written to the selected one of the plurality of tracks. In one embodiment, the correlation detector includes a low-pass filter that filters the resulting signal before the resulting signal is compared to the associated threshold. Alternatively, or in combination, a resettable integrator that integrates the resulting signal before the resulting signal is compared to the associated threshold may be used with the integrator resetting in response to a data block synchronization signal associated with each block of data written to the optical medium. Various embodiments may include generating a predetermined verification pattern for the higher power main beam having alternating periods of fixed power and random data. The predetermined verification pattern may be included in a corresponding DRAW field for each block of data written and/or may be generated in response to a request for diagnostics.

Embodiments according to the present disclosure may provide various advantages. For example, an optical storage device according to one embodiment of the present disclosure provides direct read after right functionality for data verification using a single OPU or optical head. Various embodiments of a system or method according to the present disclosure use a correlation detector strategy to reliably detect data marks in the beam reflected from a lower power satellite beam in the presence of main beam modulation and other noise. The direct read after write functionality and correlation detector strategy according to embodiments of the present disclosure can also provide real-time diagnostic information and functionalities for the drive channel of an optical storage device. For example, systems and methods according to embodiments of the present disclosure may be used to enhance write strategy, provide information on write pattern jitter, provide information to adjust and improve OPU performance and laser power, to anticipate OPU anomalies, and the like.

The above advantages and other advantages and features associated with various embodiments of the present disclosure will be readily apparent from the following detailed description when taken in connection with the accompanying drawings.

DETAILED DESCRIPTION

Various embodiments of the present disclosure are described herein. However, the disclosed embodiments are merely exemplary and other embodiments may take various and alternative forms that are not explicitly illustrated or described. The Figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the Figures may be combined with features illustrated in one or more other Figures to produce embodiments that are not explicitly illustrated or described. The combinations of features illustrated provide representative embodiments for typical applications. However, various combinations and modifications of the features consistent with the teachings of this disclosure may be desired for particular applications or implementations.

The processes, methods, logic, or strategies disclosed may be deliverable to and/or implemented by a processing device, controller, or computer, which may include any existing programmable electronic control unit or dedicated electronic control unit. Similarly, the processes, methods, logic, or strategies may be stored as data and instructions executable by a controller or computer in many forms including, but not limited to, information permanently stored on various types of articles of manufacture that may include persistent non-writable storage media such as ROM devices, as well as information alterably stored on writeable storage media such as floppy disks, magnetic tapes, CDs, RAM devices, and other magnetic and optical media. The processes, methods, logic, or strategies may also be implemented in a software executable object. Alternatively, they may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 1A:
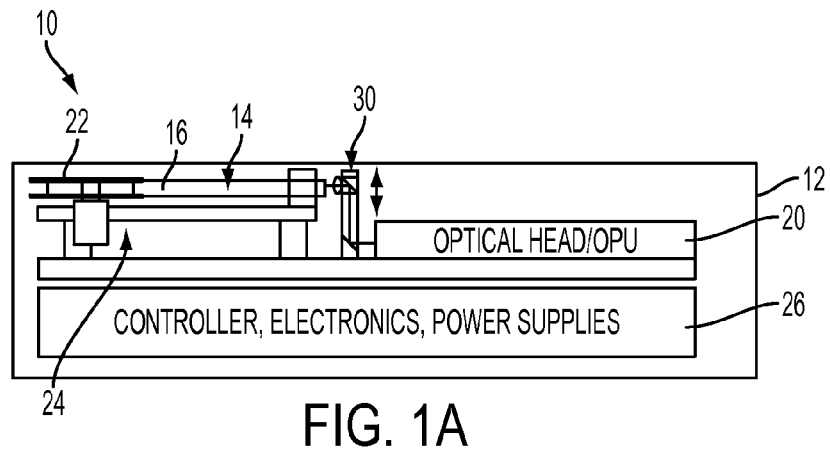
FIGS. 1A and 1B are diagrams illustrating operation of an optical data storage system or method with direct read after write (DRAW) capability according to various embodiments of the present disclosure.
Figure 1B:
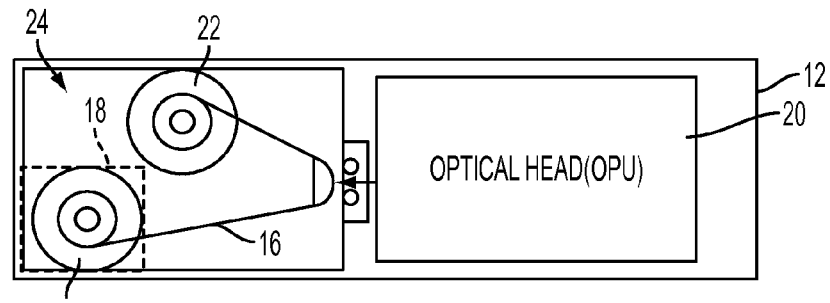

Referring now to FIGS. 1A and 1B, block diagrams illustrating operation of an optical data storage system or method with direct read after write (DRAW) capability according to various embodiments of the present disclosure are shown.

FIG. 1A is a side view diagram and FIG. 1B is a top or plan view diagram. In the representative embodiment illustrated in FIGS. 1A and 1B, optical data storage system 10 is implemented by an optical tape drive 12 that receives an optical data storage medium 14 implemented by an optical tape 16. While illustrated and described with reference to an optical tape drive, those of ordinary skill in the art will recognize that the teachings of the present disclosure may also be applied to various other types of optical data storage devices that may use various types of write-once or re-writable optical media, such as optical discs, for example. In one embodiment, optical tape 16 is a ½ inch (12.7 mm) wide tape having a plurality of tracks generally extending across the width of the tape and may vary in length depending on the desired storage capacity and performance characteristics as illustrated and described in greater detail herein. Optical tape 16 may be wound on an associated spool 30 contained within a protective case or cartridge 18 that is manually or automatically loaded or mounted in optical tape drive 12. Transport mechanism 24 moves optical tape 16 through a carriage and past at least one optical pickup unit (OPU) or optical head 20 to a take-up spool 22 that typically remains within tape drive 12. OPU 20 writes data to, and reads data from, optical tape 16 as transport mechanism 24 moves optical tape 16 between cartridge 18 and take-up spool 22 in response to at least one controller and associated electronics 26. As explained in greater detail below, data may be read/written to optical tape 16 in one or more of the plurality of tracks in a serpentine fashion as the tape travels in either direction past OPU 20, i.e. either from cartridge 18 to take-up spool 22, or from take-up spool 22 to cartridge 18.

Optical head 20 may include associated optics and related electromechanical servo controlled devices, represented generally by reference numeral 30, that split or divide a light beam, such as a laser beam, into two or more beams that are focused to corresponding spots on the storage medium for reading/writing data as illustrated and described in greater detail with reference to FIG. 2. Various servo mechanisms (not specifically illustrated) may be used to position/align the beams with a selected one of the plurality of tracks on optical tape 16.

Figure 2:
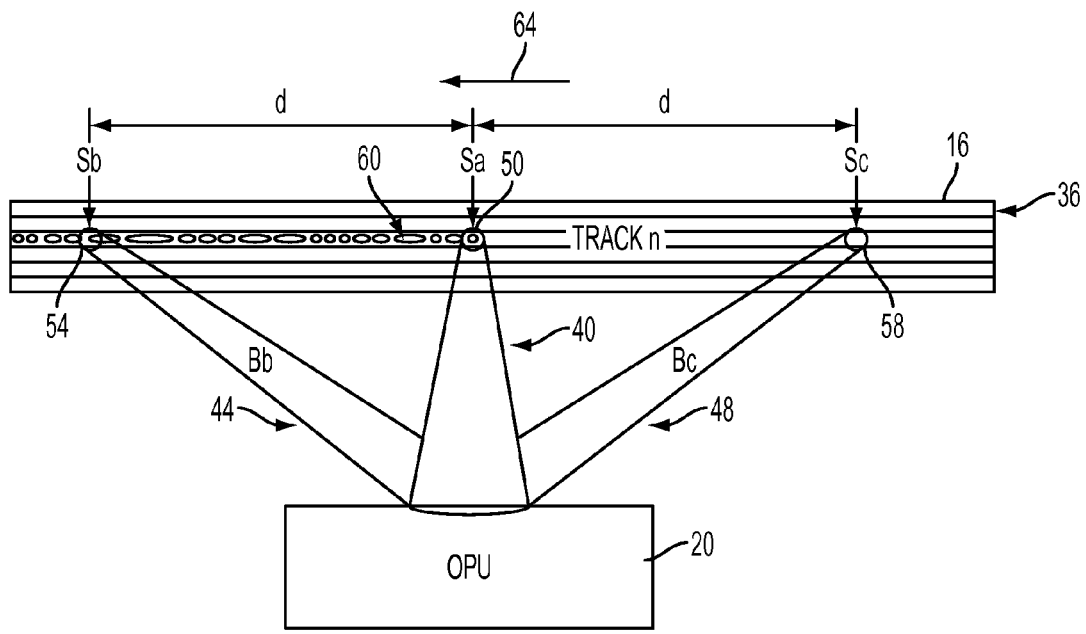
FIG. 2 is a block diagram illustrating operation of an optical pickup unit (OPU) having a coherent light beam split or divided into a center beam and two satellite or side beams to provide DRAW capability according to various embodiments of the present disclosure.

FIG. 2 is a block diagram illustrating operation of an optical pickup unit (OPU) 20 having a coherent light beam split or divided into a center beam 40 and two satellite or side beams 44, 48 to provide DRAW capability according to various embodiments of the present disclosure. Beams 40, 44, and 48 may be generated by a single or common coherent light source, such as a laser diode, for example. The source beam travels through associated optics, that may include a diffraction grating, for example, to divide or split the source beam into center beam 40, first side beam 44, and second side beam 48 and to focus the beams to corresponding spots 50, 54, and 58, respectively, on the surface of optical tape 16 within a selected one of the plurality of tracks 36. The three optical spots 50, 54, and 58 are manipulated by various optical and electrometrical elements of OPU 20 to write and retrieve data from optical tape 16.

The optical elements used to split the source beam and focus the resulting beams to spots 50, 54, and 58 may be designed to provide higher power to center beam 40 and center spot 50 with lower power to side beams 44, 48 and associated spots 54, 58. For example, center spot 40 may contain about 60-70% of the source beam power with side beams 44, 48 dividing the remaining 40-30% of the source beam power. Center beam 40 is modulated by OPU 20 to generate write marks 60 during writing of data to optical tape 16, which may require about ten times more average power than to read previously stored data (such as about 10 mW to write data and about 0.7 mW to read data, for example). As such, if the source beam is modulated and produces sufficient power for writing data using the center beam/spot 40/50, side beams 44, 48 will be modulated in a like manner but will contain insufficient power to alter tape 16. In the representative embodiment illustrated, spots 50, 54, and 58 are mechanically aligned in the OPU manufacturing process to correspond to the axes of data tracks 36 on preformatted optical tape media 16. In addition, satellite spots 54, 58 are generally symmetrically positioned relative to center spot 50 so that transit distance (d) of tape 16 between center spot 50 and either satellite/side spot 54, 58 is substantially the same. Representative embodiments may include a distance (d) of between about 10-20 μm.

Some conventional optical storage devices use center spot 50 from the higher power emitting beam 40 for reading, writing, and focusing in addition to one type of tracking operation. Satellite spots 54, 58 formed by the lower power side-beams 44, 48 are used for another type of tracking for specific types of media. In these applications, side spots 54, 58 may not be aligned with one another, or with center spot 50 along a single track 36 of optical tape 16. In contrast to the conventional function of satellite beams 44, 48, various embodiments according to the present disclosure provide tracking using light reflected from main spot 50 so that satellite spots 54, 58 can be used to provide direct read after write (DRAW) functionality as described below. In one embodiment, light reflected from main beam 40 is used in a differential push/pull tracking strategy that does not require satellite beams 44, 48 for tracking. Of course, the satellite beam located upstream of main beam 40 relative to the current direction of media travel may be available for use in tracking if desired.

As previously described, the source laser beam is operated at a higher power (relative to operation during a data read/retrieval) and modulated to write data marks 60 on a selected one of the plurality of tracks 36 on optical tape medium 16. However, only center beam 40 emits enough power to the optical tape 16 to actually alter the structure of the optically active layer of as represented by data marks 60. Satellite beams 44, 48, having much lower power as determined by the diffraction grating power distribution, do not alter tap 16. As recognized by the present disclosure, satellite beams 44, 48 have enough power after being reflected from optical tape 16 to detect data marks 60. Therefore, depending on the direction of travel of optical tape 16, the reflection from an associated satellite spot 54, 58 can be detected by OPU 20 and used to verify data marks 60 directly after being written by main beam/spot 40/50 to provide DRAW operation.

While the reflected beam associated with one of the satellite beams 44, 48 (depending on the direction of travel of tape 16) contains information associated with the data marks 60 on tape medium 16, the reflected beam is heavily contaminated by the modulation of center beam 40 and other noise sources and generally exhibits a very low signal to noise ratio (SNR). As such, various embodiments of the present disclosure include a correlation detector to reliably extract the information in the reflected beam associated with data marks 60 from the reflected satellite spot 54 corresponding to data immediately previously written by center spot 50 during DRAW operation. In the representative embodiment illustrated in FIG. 2, tape 16 is traveling in a first direction from right to left as generally represented by arrow 64. The system operates in a similar fashion when tape 16 is traveling in a second direction that is opposite the first direction such that data written by center spot 50 is read directly after writing using reflected light from satellite spot 58, wherein satellite spot 58 and center spot 50 are substantially aligned with the same selected one of the plurality of tracks 36 as represented by "Track n" in FIG. 2.

Figure 3:
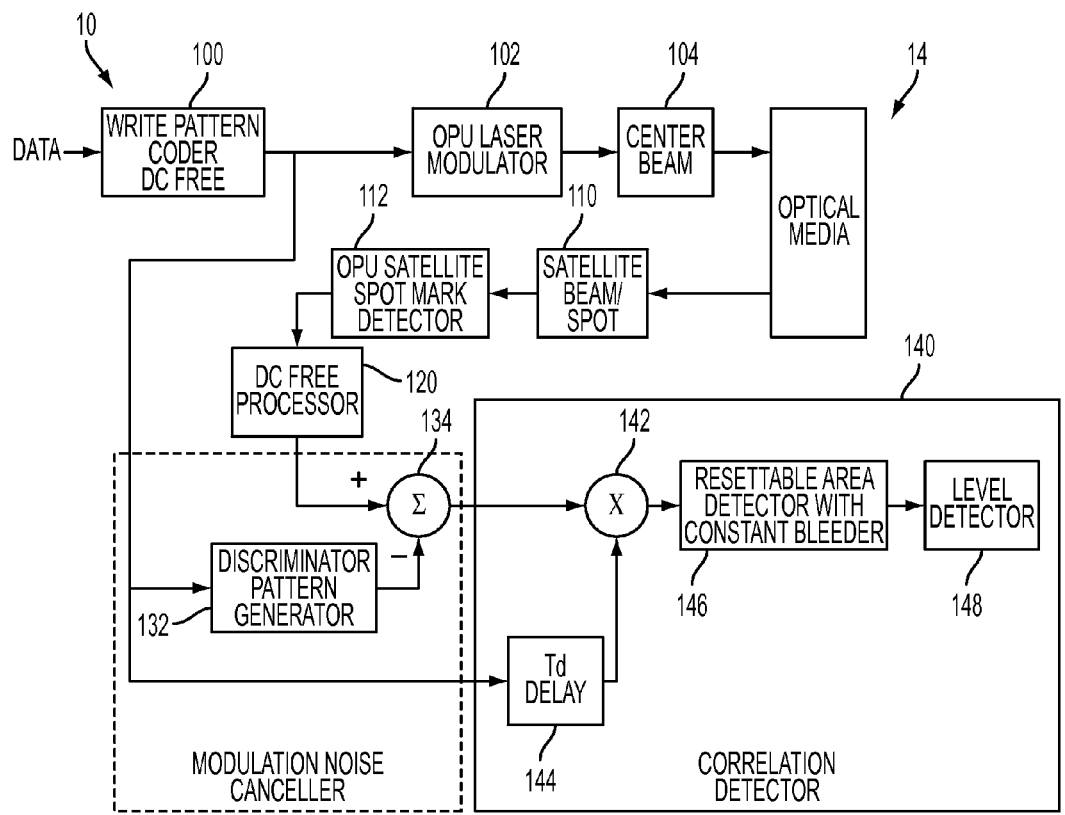
FIG. 3 is a block diagram illustrating operation of a DRAW system or method for optical data storage according to various embodiments of the present disclosure.

FIG. 3 is a block diagram illustrating operation of a DRAW system or method for optical data storage according to various embodiments of the present disclosure. Controller 26 (FIG. 1) communicates data to a DC-free write pattern coder 100. OPU laser modulator 102 modulates the source laser beam based on the write pattern received from coder 100 to generate a modulated center beam 104 that is focused to a corresponding spot on optical media 14 at a first position within a selected one of a plurality of tracks as optical media 14 moves past. The first position arrives at the location of a downstream satellite beam spot at a later time ($T_d$) associated with a transit delay based on the media speed. While center beam 104 is writing data to a second location of optical media 14, and modulating the satellite beams in a similar fashion based on the data being written, the beam reflected from the downstream satellite beam/spot 110 is detected by OPU satellite spot mark detector 112. As such, the reflected beam contains information associated with data marks immediately previously written to the first location by center beam 104, as well as the data currently being written to optical media 14 at the second location.

The signal or related information from OPU satellite spot mark detector 112 is processed by DC-free processor 120 and provided to modulation noise canceller 130 to reduce or eliminate the modulation noise associated with modulation of center beam 104 for data currently being written at the second location while satellite beam/spot 110 reads the previously written data from the first location. Canceller 130 includes a discriminator pattern generator 132 that uses information from write pattern coder 100 to subtract the effect of the modulation of center beam 104 at summing block 134.

As also illustrated in FIG. 3, correlation detector 140 determines similarity between the read signal associated with data detected by the at least one lower power side beam/spot 110 and a time-shifted write signal provided by write pattern coder 100 and time delay ($T_d$) block 144 associated with the higher power main beam 104 to verify data written to optical media 14 directly after writing. The time delay $T_d$ represents the transit time or transit delay associated with optical media 14 moving between the main spot 50 and a downstream side spot 54, 58 and may vary based on the actual or estimated speed of optical media 14. Block 142 combines the modulation noise canceled read signal from block 134 and the time-shifted write signal from block 144 and compares the resulting signal to an associated threshold as represented by level detector 148 to verify data written to the selected one of the plurality of tracks. In the representative embodiment illustrated in FIG. 3, system 10 compares the signals by multiplying or determining a product as represented by block 142 with the resulting signal provided to resettable integrator or area detector 146 before the resulting signal is compared to the associated threshold by level detector 148. Resettable area detector or integrator 146 may be periodically reset to a predetermined value (such as zero or other designated value) by an associated signal, such as a data synchronization signal associated with each block of data written to optical media 14. Alternatively, a constant bleeder or decrementing function may be used to adjust the integrator value over time.

Figure 4:
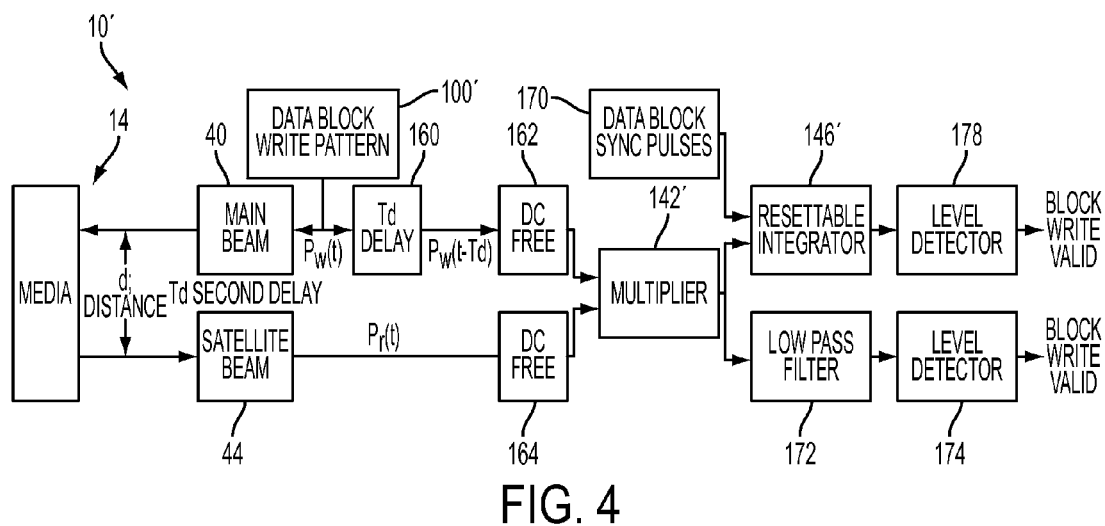
FIG. 4 is a block diagram illustrating one embodiment of a correlation detector for an optical data storage device according to the present disclosure.

FIG. 4 is a block diagram illustrating one embodiment of a correlation detector in a system or method for optical data storage according to the present disclosure. In general, the fundamental function of a correlation estimator or detector as illustrated in the representative embodiments of FIGS. 3 and 4 is to provide a measure or estimate of the similarity between two signals or patterns of data. As used in the representative embodiments illustrated and described in this disclosure, correlation detectors or estimators detect the presence of a specified pattern of data within a very noisy signal and provide a corresponding signal or other output that can be used to measure the degree of correlation or similarity between the two patterns or signals.

In the DRAW embodiment of FIG. 4, the data block write pattern 100' is used to modulate main beam 40 with the data signal represented generally by $P_w(t)$ and create corresponding marks on the optical media 14 at the main spot location. Satellite beam 44 creates a spot a distance "d" downstream relative to main beam 40 to read data directly after writing as previously described. The signal associated with light reflected from the satellite beam 44 contains information from the data marks passing by satellite beam 44 that were just written by main beam 40 $T_d$ seconds earlier (as represented by $P_w(t-T_d)$ in addition to noise from modulation of main beam 40 and other sources as any additional data is written by main beam 40. This signal is detected by the OPU detectors and is generally represented by $P_r(t)$. The "time stamp" of the $P_w(t-T_d)$ data-block patterns within the $P_r(t)$ signal is known or can be determined/estimated using the transit delay 160 based on the media speed and distance "d" between main beam 40 and satellite beam 44.

After passing through corresponding DC-free processors 162 and 164, the satellite signal associated with data read by the satellite beam and represented by $P_r(t)$ is compared to the signal $P_w(t-T_d)$ provided to the center beam for writing data, but that is time-shifted based on the transit time of the optical media 14 moving from center or main beam 40 to satellite beam 44 at block 142'. In this embodiment, block 142' performs real-time multiplication (analog or digital) of the satellite signal represented by $P_r(t)$ with the time adjusted data block write pattern, $P_w(t-T_d)$. This results in a pattern with a DC value representing the similarity or correlation of the two signals. Any uncorrelated signal or noise in the two signals results in additive patterns with "zero-mean value". Therefore, application of a low-pass filter block 172 and/or a resettable integrator 146' to the result of the comparison (multiplication in this example) produces a signal with magnitude indicative of existence of the written pattern within the satellite signal. Resettable integrator 146' may be reset to zero or another value in response to a corresponding signal, such as a data block synchronization pulse 170, for example. The output from resettable integrator 146' is compared to a corresponding threshold by level detector 178. If the result exceeds the threshold, then the block write is determined to be valid. Similarly, the output from low pass filter (LPF) 172 is compared to a corresponding threshold by level detector 174 with a block write valid signal when the result exceeds the threshold.

The signal correlation strategies employed by the correlation detectors illustrated in the representative embodiments of FIGS. 3 and 4 are generally known in the signal processing art. As described above, if the detected mark pattern (data) from the satellite beam 44 is the same or well-correlated to the mark pattern written by the main beam 40 then the delayed pattern correlation filters or detectors shown in FIGS. 3 and 4 are capable of detecting the similarities and verifying that data is being written. However, since the delayed data being read by the satellite spot is greatly contaminated by the uncorrelated modulations of the main beam, the process of detection of the written data in these representative embodiments is cumulative over a block of data and the results are generally statistical rather than deterministic in nature. This is generally not problematic for data storage devices because they typically buffer and record data in blocks. In addition, write errors generally result in re-writing an entire block of data.

FIGS. 5A-5D illustrate representative signals in an optical data storage system or method having DRAW functionality according to various embodiments of the present disclosure. The representative signals illustrated were generated using a computer model of the block diagram of FIG. 4, with application of ten consecutive data blocks of random binary numbers representing the patterns of write data blocks. Line 200 represents the write patterns. Line 200' represents the delayed or time-shifted write pattern shifted by the transit delay time Td as represented by line 202. Line 206 represents the satellite or side-beam signal. Random write failure periods were embedded by modifying the patterns in satellite signal 206 at random locations and with random durations/periods. Also, the effect of uncorrelated modulation of the laser beam due to the write process was implemented in the model by continued amplitude modulation of the satellite beam with uncorrelated write data patterns.

Figure 5A:
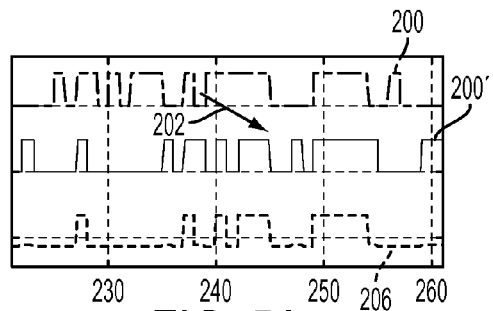
FIGS. 5A-5D illustrate representative signals in an optical data storage system or method having DRAW functionality according to various embodiments of the present disclosure.
Figure 5B:
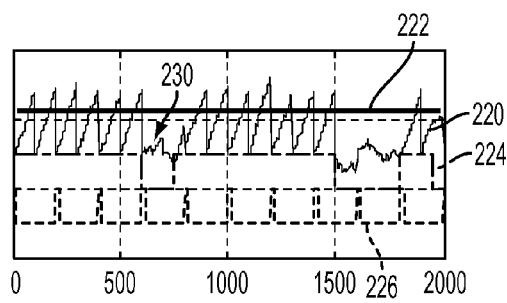
Figure 5C:
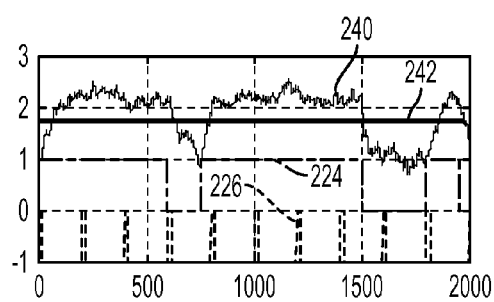
Figure 5D:
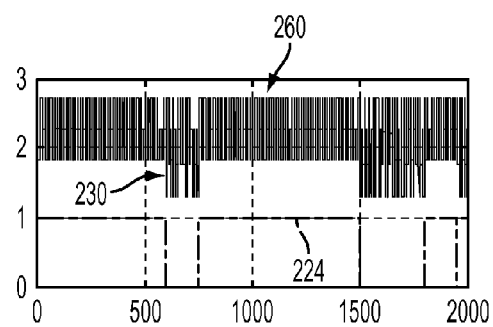

FIG. 5B illustrates operation of a resettable integrator 146' (FIG. 4) with line 220 illustrating the integrated value, line 222 representing a correspond threshold, line 224 representing the embedded error, and line 224 representing data block synchronization pulses. As shown in FIG. 5B, valid data blocks are indicated where the integrator value 220 exceeds a corresponding threshold 222. Areas where the integrator value represented by line 220 does not reach threshold 222, such as indicated at 230, corresponds to an error as indicated by line 224 and is detected as an invalid data block or write error as represented by correlation signal 260 in FIG. 5D. Similarly, FIG. 5C illustrates operation of a low pass filter 172 (FIG. 4) with line 240 representing the output signal, line 242 representing a corresponding threshold, line 224 representing the embedded error signal, and line 226 representing the data synchronization pulses. As shown in FIG. 5C, a valid data block write is indicated when output 240 exceeds a corresponding threshold 242 as determined by level detector 174 (FIG. 4). Depending on the particular application and implementation, a resettable integrator or low pass filter may be used alone or in combination.

Figure 6:
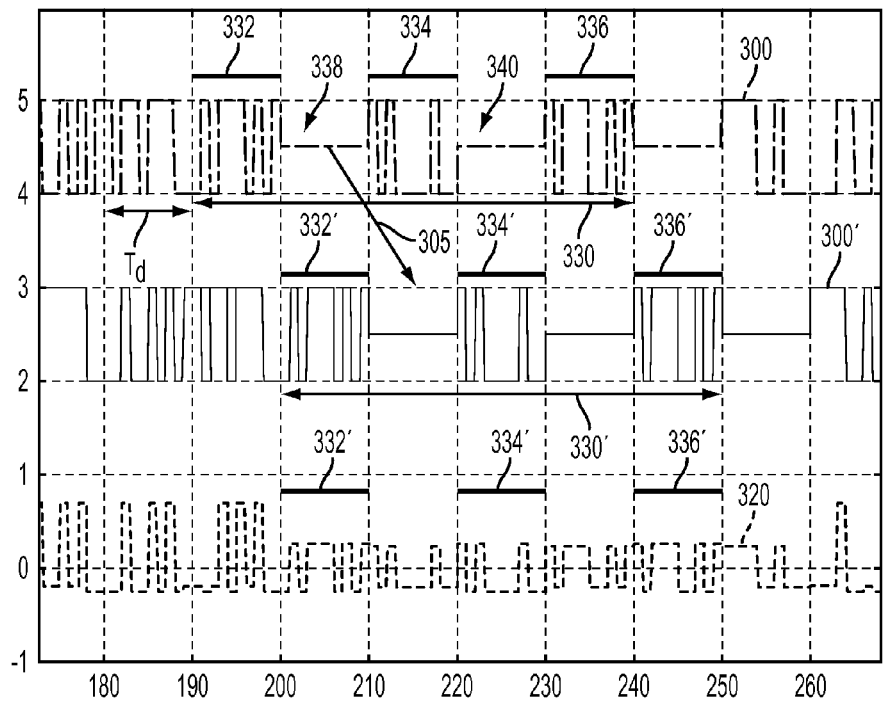
FIGS. 6 and 7 illustrate operation of a DRAW system or method for optical data storage using a predetermined data verification pattern to provide deterministic DRAW operation according to embodiments of the present disclosure.
Figure 7:
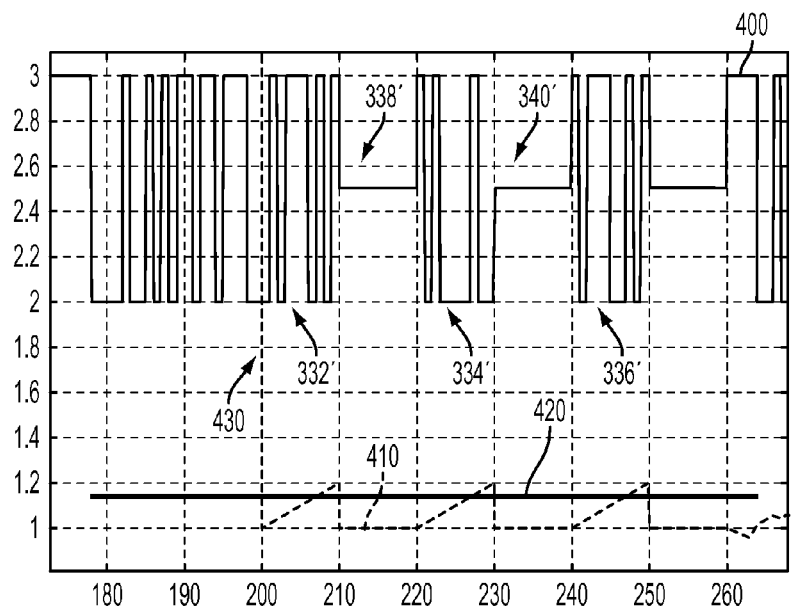

FIGS. 6 and 7 illustrate operation of a DRAW system or method for optical data storage using a predetermined data verification pattern to provide deterministic DRAW operation according to embodiments of the present disclosure. The representative signals illustrated were generated using a computer model similar to the previously described model, but signals modified as described below. The statistical behavior of correlation detectors as previously described generally results from the uncorrelated modulation present in the satellite beam from the concurrent write process. To further improve the robustness of the previously described correlation strategies, a specific data field having a predetermined verification pattern selected to reduce or eliminate the effect of the main beam write modulation on the satellite beam read signal may be used in one or more data blocks to provide deterministic DRAW operation.

FIG. 6 illustrates representative signals or patterns that may be used to provide deterministic DRAW operation according to various embodiments of the present disclosure. Line 300 represents a write pattern having a verification pattern or DRAW field represented generally by reference numeral 330. Verification pattern or DRAW field 330 includes fixed power periods indicated at 338 and 340 of write beam (set to read power value for the appropriate satellite beam or spot) alternating with periods of random data marks as indicated at 332, 334, and 336. The time-shifted or delayed write pattern signal is represented by line 300' with corresponding time-shifted periods of generally constant power alternating with time-shifted periods of random data marks 332', 334', and 336' during the time-shifted verification period or DRAW field 330'. If the periods of constant or fixed power substantially correspond to the transit time or delay ($T_d$), the downstream satellite beam will encounter and detect the random data marks 332' and 334', for example during constant power (no modulation) periods of the main beam at 338, 340, respectively. As such, the effect of main beam modulation is substantially eliminated from the satellite signal because there are no write pulses during these periods. Therefore, the result of the correlation detectors and the reset integrator block would be free of write power modulation as generally illustrated in FIG. 7.

Line 400 of FIG. 7 represents the time-shifted or delayed write patterns including alternating periods of constant power 338', 340' and periods of random data marks 332', 334', and 336'. Line 410 illustrates operation of a resettable integrator with a corresponding threshold 420 applied by a level detector to determine valid write data. The integrator may be reset in response to a data synchronization signal as generally indicated at 430. As indicated in FIG. 7, the integrator signal does not detect valid data during the constant power periods 338' and 340' due to the DC-free processing previously described. This result may vary depending on the particular coding strategy employed. However, the system may include appropriate logic that to indicate valid data or provide another indication during these periods. In one embodiment, a verification field or DRAW field 330' is provided at least once in every data block to provide a deterministic status of write process integrity. This method can be utilized by itself or in conjunction with the previously described correlation detection strategy to improve the robustness of the OPU. Alternatively, or in combination, a DRAW field or verification pattern may be generated in response to a signal, such as a request for diagnostics. In one embodiment, the read/write channel can request such an intermittent DRAW field or verification operation whenever the integrity of the write function is in question.

Figure 8A:
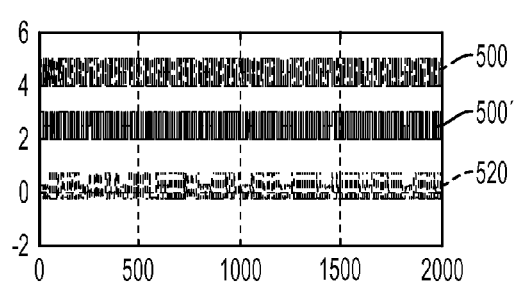
FIGS. 8A-8D illustrate representative signals in an optical data storage system or method having deterministic DRAW operation according to embodiments of the present disclosure.
Figure 8B:
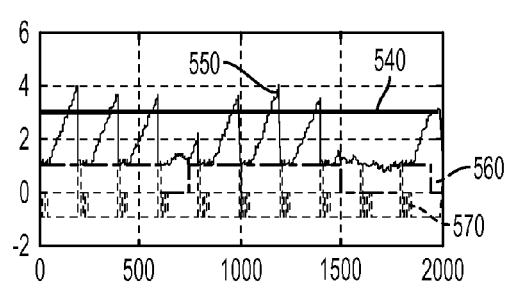
Figure 8C:
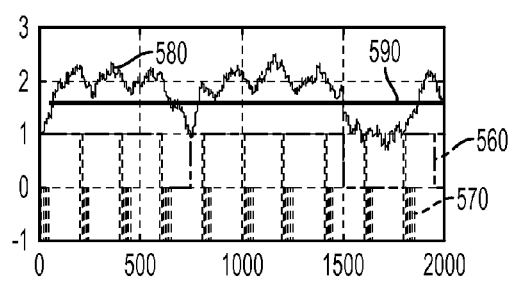
Figure 8D:
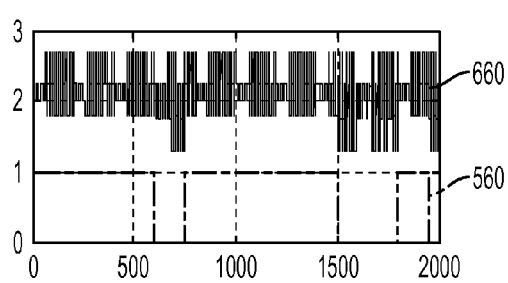

FIGS. 8A-8D illustrate representative signals in an optical data storage system or method having deterministic DRAW operation according to embodiments of the present disclosure. Similar to the embodiment described with reference to FIGS. 5A-5D, the representative signals of FIGS. 8A-8D were generated using a corresponding computer model to demonstrate deterministic DRAW operation with a DRAW field or verification pattern as previously described. In FIG. 8A, line 500 represents the write patterns with line 500' representing the time-shifted or delayed write patterns that include at least one verification pattern or DRAW field. Line 520 represents the satellite signal. Line 530 of FIG. 8B represents the value for the resettable integrator. Line 560 represents the embedded error signal and line 570 represents the data block synchronization pulses. FIG. 8C illustrates operation of a low pass filter block with line 580 representing the filter outlet, which is compared to a corresponding threshold 590 by a level detector with valid data indicated where the output 580 exceeds the threshold 590. FIG. 8D illustrates the output of the correlation detector as represented by line 660 based on the resettable integrator output and/or the low pass filter output.

As illustrated in FIGS. 8A-8D, a system or method for optical data storage with deterministic direct read after write (DRAW) using a satellite beam downstream of a main beam may use a DRAW field or verification pattern to reduce or eliminate the effect of main beam modulation during satellite beam data reading/verification to improve robustness.

As illustrated and described above, embodiments of an optical data storage system and/or method according to the present disclosure may provide various advantages. For example, an optical storage device according to one embodiment of the present disclosure provides direct read after right functionality for data verification using a single OPU or optical head. Various embodiments of a system or method according to the present disclosure use a correlation detector strategy to reliably detect data marks in the beam reflected from a lower power satellite beam in the presence of main beam modulation and other noise. The direct read after write functionality and correlation detector strategy according to embodiments of the present disclosure can also provide real-time diagnostic information and functionalities for the drive channel of an optical storage device. For example, systems and methods according to embodiments of the present disclosure may be used to enhance write strategy, provide information on write pattern jitter, provide information to adjust and improve OPU performance and laser power, to anticipate OPU anomalies, and the like.

While exemplary embodiments are described above, it is not intended that these embodiments describe all possible forms encompassed by the claims. The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to: cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An optical storage system that receives an optical medium having a plurality of tracks for storing data, the system comprising:
    an optical head having optics that split a light beam into a higher power main beam and at least one lower power side beam that form corresponding spots spaced along a selected one of the plurality of tracks;
    at least one controller coupled to the optical head that selectively positions the optical head for writing data along the selected one of the plurality of tracks using the higher power main beam while reading data directly after writing from the selected one of the plurality of tracks using the at least one lower power side beam; and
    a correlation detector that determines a correlation between a write signal provided to the higher power main beam that is time shifted based on transit delay of the optical medium moving between the main beam and the at least one side beam, and a read signal from the at least one lower power side beam after the transit delay, wherein valid data is determined based on the correlation exceeding a corresponding threshold.

2. The system of claim 1 wherein the correlation detector combines the read signal and the time-shifted write signal and compares a resulting signal to an associated threshold to verify data written to the selected one of the plurality of tracks.

3. The system of claim 2 further comprising a low-pass filter that filters the resulting signal before the resulting signal is compared to the associated threshold.

4. The system of claim 2 further comprising a resettable integrator that integrates the resulting signal before the resulting signal is compared to the associated threshold, the integrator resetting in response to a data block synchronization signal associated with each block of data written to the optical medium.

5. The system of claim 1 wherein the optical medium comprises an optical tape with the plurality of tracks extending generally across a width of the optical tape and wherein the system comprises an optical tape drive that receives the optical tape.

6. The system of claim 1 wherein the controller generates a predetermined verification pattern for the higher power main beam having alternating periods of fixed power and random data.

7. The system of claim 6 wherein the controller generates the predetermined verification pattern for each block of data written to the optical medium.

8. The system of claim 6 wherein the controller generates the predetermined verification pattern in response to a request for diagnostics.

9. The system of claim 1 wherein the optical head splits the light beam into a higher power main beam and first and second lower power side beams wherein the first lower power side beam reads data when the optical medium travels in a first direction and the second lower power side beam reads data when the optical medium travels in a second direction opposite the first direction.

10. A method for providing direct read after write functionality for an optical storage device having an optical head that splits a light beam into a center beam that writes data to a selected one of a plurality of tracks of an optical storage medium and at least one satellite beam that reads previously written data directly after writing, the center beam and at least one satellite beam forming corresponding spots spaced along the selected track, the method comprising:
  comparing a first signal associated with data read by the at least one satellite beam to a second signal provided to the center beam for writing data that is timeshifted based on a transit time of the optical medium moving from the center beam to the at least one satellite beam, wherein comparing comprises multiplying the first and second signals to determine a correlation signal and comparing the correlation signal to a threshold to verify data written to the optical storage medium.

11. The method of claim 10 further comprising low-pass filtering the correlation signal before comparing the correlation signal to the threshold.

12. The method of claim 10 further comprising:
  integrating the correlation signal to provide an integrated signal;
  resetting the integrated signal in response to a data synchronization signal associated with a block of data written to the optical storage medium; and
  comparing the integrated signal to the threshold.

13. The method of claim 10 wherein the optical storage medium comprises an optical tape with the plurality of tracks extending generally across a width of the optical tape.

14. The method of claim 10 further comprising generating a predetermined verification pattern for the center beam having alternating periods of constant power and random data.

15. An article of manufacture including a non-transitory computer readable medium having stored thereon logic for providing direct read after write functionality for an optical storage device with an optical head that splits a light beam into a center beam and at least one satellite beam that form corresponding spots spaced along a selected one of a plurality of tracks of an optical storage medium, the logic executed by a computer to perform the operation comprising:
  writing data to the selected one of the plurality of tracks using the center beam;
  reading previously written data directly after writing using the at least one satellite beam;
  comparing a first signal associated with data read by the at least one satellite beam to a second signal provided to the center beam for writing data that is time-shifted based on a transit time of the optical medium moving from the center beam to the at least one satellite beam; and
  determining a product of the first and second signals, applying a low-pass filter to the product, and comparing a resulting signal to a corresponding threshold to verify data written to the optical storage medium.

16. The article of manufacture of claim 15, wherein the logic further comprises generating a predetermined verification pattern for the center beam having alternating periods of constant power and random data.

* * * * *